United States Patent [19]

Bowen

[11] 4,341,200

[45] Jul. 27, 1982

[54] SOLAR ENERGY COLLECTOR SUB-ASSEMBLIES AND COMBINATIONS THEREOF

[75] Inventor: John C. Bowen, Huntingdon Valley, Pa.

[73] Assignee: Ametek, Inc., New York, N.Y.

[21] Appl. No.: 134,961

[22] Filed: Mar. 28, 1980

Related U.S. Application Data

[63] Continuation-in-part of Ser. No. 935,406, Aug. 21, 1978, Pat. No. 4,201,190.

[51] Int. Cl.³ .............................................. F24J 3/02
[52] U.S. Cl. .................................... 126/417; 126/450
[58] Field of Search ................ 126/450, 417; 165/67, 165/68, 76, 77, 78, 80, 81, 82

[56] References Cited

U.S. PATENT DOCUMENTS

| | | | |
|---|---|---|---|
| 4,231,204 | 11/1980 | Kreuger et al. | 126/450 |
| 4,240,407 | 12/1980 | Spencer | 126/444 |
| 4,249,519 | 2/1981 | Martinez | 126/450 |
| 4,252,103 | 2/1981 | Carter | 126/446 |
| 4,252,109 | 2/1981 | Newton | 126/450 |
| 4,263,896 | 4/1981 | Zebuhr | 126/450 |
| 4,265,221 | 5/1981 | Winnery | 126/450 |
| 4,266,383 | 5/1981 | Krueger | 126/450 |
| 4,278,070 | 7/1981 | Bowen | 126/417 |
| 4,278,076 | 7/1981 | Hopper | 126/442 |
| 4,280,484 | 7/1981 | Mancuso | 126/450 |

*Primary Examiner*—Daniel J. O'Connor
*Attorney, Agent, or Firm*—Ratner & Prestia

[57] ABSTRACT

Improved solar collector sub-assemblies and combinations thereof includes corner-locking piece sub-assemblies, top glazing clamping member sub-assembly, collector plate mounting member sub-assembly and collector assembly mounting means, all adapted to facilitate assembly and installation of collectors in accordance with the present invention and to permit thermal expansion of components thereof.

1 Claim, 8 Drawing Figures

SOLAR ENERGY COLLECTOR SUB-ASSEMBLIES AND COMBINATIONS THEREOF

This is a continuation in part of U.S. application Ser. No. 935,406, filed Aug. 21, 1978, now U.S. Pat. No. 4,201,190, of common inventorship and assignment herewith.

This invention pertains to various solar energy collector sub-assemblies and combinations thereof. Particularly it pertains to certain improved mounting means, side member corner locking means, top glazing clamping means, and collector plate holding means, as set forth in more detail below, and all particularly adapted to solar collectors of the type disclosed and claimed in the parent application, the specification and drawings of which are incorporated herein by reference.

In the field of solar collector assemblies there is a continuing need to provide simpler and more effective housing component securing means, and collector plate and assembly mounting means. Particularly needed are such means which will permit thermal expansion of assembly components, and easier installation of the assembly, particularly to provide for installation at different angles and upon different mounting bases. These and other needs are met by the solar collector sub-assemblies of the present invention and combinations thereof.

Briefly, the present invention encompasses a number of solar collector sub-assemblies including a U-shaped mounting means adapted to be received in the slots of a lengthwise channel along the outer edges of a collector assembly, the lengthwise channel of the assembly having slots to receive the up-standing legs of the U-shaped mounting member and the U-shaped mounting member having an elongated mounting hole to permit sliding thereof for thermal expansion or easier installation. A further sub-assembly feature of the present invention is a spring loaded top glazing clamp comprising a spring loaded clamp member overlying the glazing and pressing the glazing into engagement with an upwardly faced glazing support member extending inward from the side member, the side member also having an upwardly extending portion adapted to engage and lock the spring loaded clamp member.

Still another sub-assembly feature of the present invention is corner locking means comprising inward projections near the top and bottom of the corner-mating side members, with a corner locking piece to fit into the projections in a manner adapted to secure together the corner mating side members.

A further sub-assembly feature of the present invention provides for support of a collector plate within a solar collector housing in a manner to permits its thermal expansion. This support means comprises spring clips retained along two opposite edges of a rectangular collector member and supported above and below the collector member in a manner to permit slight lengthwise movement of the spring clips along the opposed edges of the plate. In this sub-assembly, spring clips are also fastened to one of the remaining edges of the plate and are retained above the plate in a manner to permit slight lengthwise movement thereof along that edge of the plate. The remaining edge of the plate is secured by fastening means also secured to the adjacent side member of the assembly. In general, these mounting means are designed to support the plate while permitting both lengthwise and widthwise thermal expansion. This may be done in various ways other than that specifically disclosed herein.

For a better understanding of this invention, reference may be made to the detailed description thereof which follows, taken in conjunction with the sub-joined claimed and the drawings in which:

Figure 1:
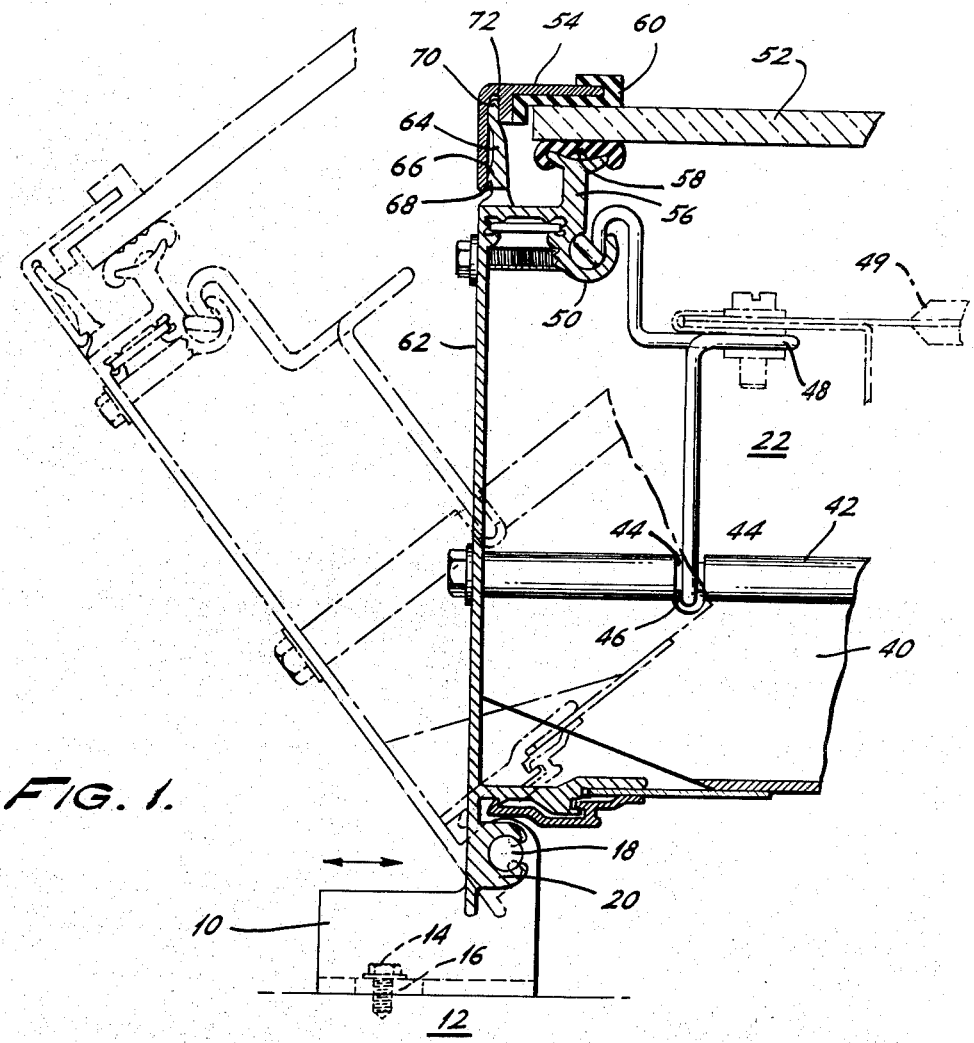
FIG. 1 is a sectional view of a side member of a collector in accordance with the present invention, also depicting a mounting means of a sub-assembly of the present invention.

Turning more specifically to FIG. 1, there is shown a mounting member 10, bolted to a support means 12 with bolt 14 in elongated whole 16, in a manner permitting easy installation of the assembly to its base support, and/or permitting slight sliding engagement of mounting member 10 in its support, so as to provide for thermal expansion of the collector assembly. Mounting member 10 is retained by shaft 18 in a mounting channel 20 running lengthwise exteriorily along one side of a collector assembly 22, seen in a partial sectional view in FIG. 1. In phantom, solar collector assembly 22 is shown angularly disposed so as to indicate the ease of installation of assembly 22 at different angular inclinations through mounting members 10. Further details of mounting member 10 are seen in FIGS. 3 and 4.

Figure 3:
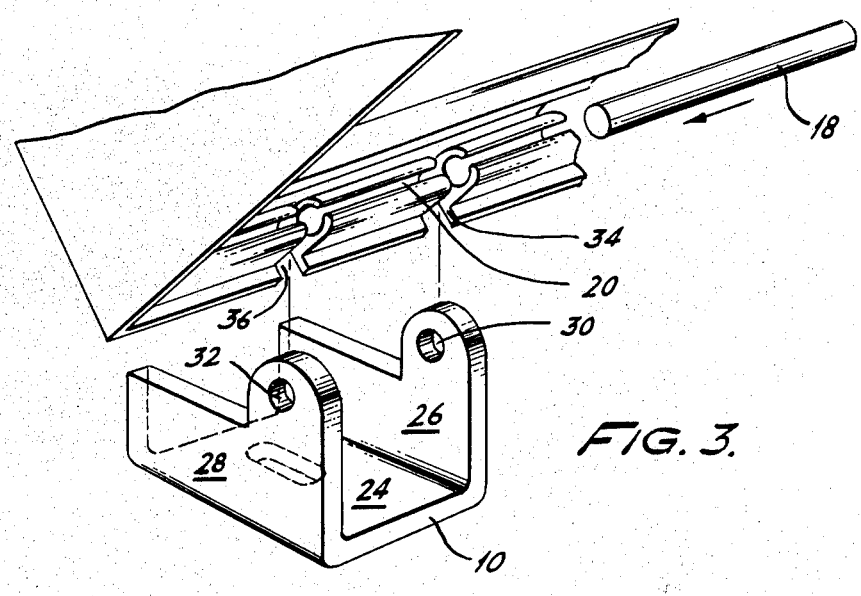
FIG. 3 is a detailed disassembled view of a mounting means of the present invention.
Figure 4:
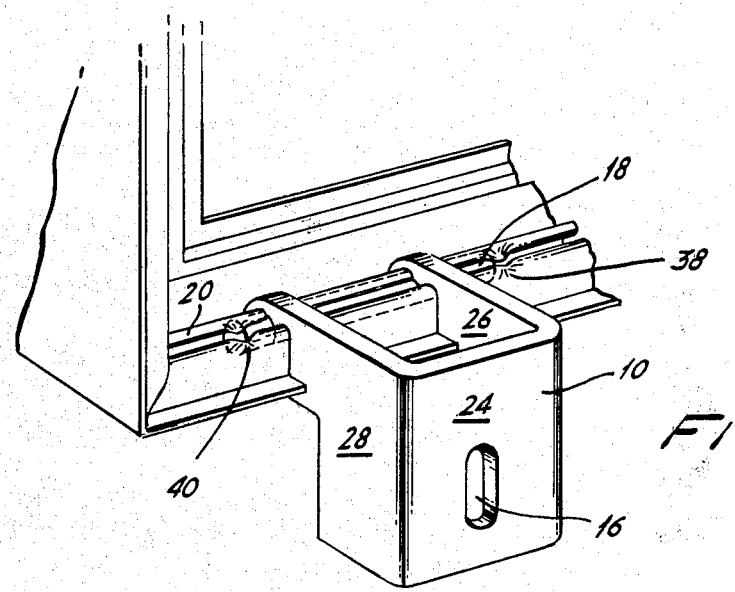
FIG. 4 is a detailed assembly view of the mounting means otherwise shown in FIGS. 1 and 3.

In FIGS. 3 and 4, U-shaped mounting member 10 is seen to consist of a central leg 24, which includes elongated bolt hole 16, and side legs 26 and 28, each including aligned holes 30 and 32 (which may also be elongated, to accomodate thermal expansion) for receiving shaft 18 when legs 26 and 28 are disposed in slots 34 and 36, provided for that purpose in channel 20.

As seen in FIG. 4, channel 20 may include crimps 38 and 40 to lock shaft 18 in place after assembly 30.

Figure 2:
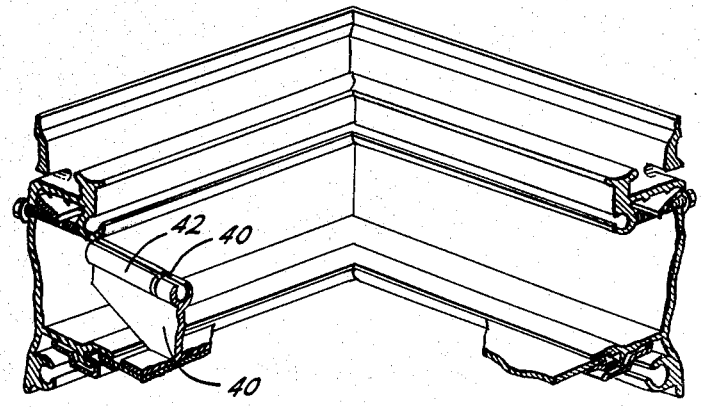
FIG. 2 is cut-away perspective view of corner-mating side members of an assembly, of the type shown in FIG. 1.

Turning back to FIGS. 1 and 2, the solar collector assembly shown in FIG. 1 there also includes an upside-down "T-shaped" brace 40 with a top channel 42 and slots 44 therein to receive a shaft 46 in which is retained the bottom leg of a spring clip mounting member 48 at the center of which is fastened a solar collector plate, 49 (shown in phantom in FIG. 1) along two opposite edges thereof; the top of spring clip 48 is further adapted to be received in a channel 50, spring clip 48 and its mounting means thus being adapted to permit slight lengthwise movement of a collector plate fastened thereto along the edges thereof.

In accordance with one specific sub-assembly feature of the present invention, such spring clip mounting means are combined with similar clip means not including the lower leg, disposed along one remaining edge of the collector plate, with the remaining edge of the collector plate securely fastened (such as by a clip 90 shown in FIG. 1A of the parent application) to the adjacent side member of the assembly. In this manner, the collector plate is firmly retained within the assembly while providing for thermal contraction and expansion thereof.

In accordance with the present invention, an improved top glazing clamping member is provided. This member consists of a spring channel 54, running along the sides of solar collector assembly 22 and clamping, through gasket 60 top glazing 42 against a lower gasket 58 sitting on an upwardly projecting top glazing support member 56 which projects in from side member 62 of solar collector assembly 22. Spring channel 54 is retained and spring biased to clamp top glazing 52 downwardly by an upward extension 64 of side member 62, the upward extension 64 including a top tip 72 adapted to be retained in a slot 70 of spring channel 54, and an outwardly projecting tip 66 adapted to engage inward dog 68 of spring channel 54, whereby spring channel 54 is slightly deflected and thereby spring biased into engagement with top glazing 52.

Figure 5:
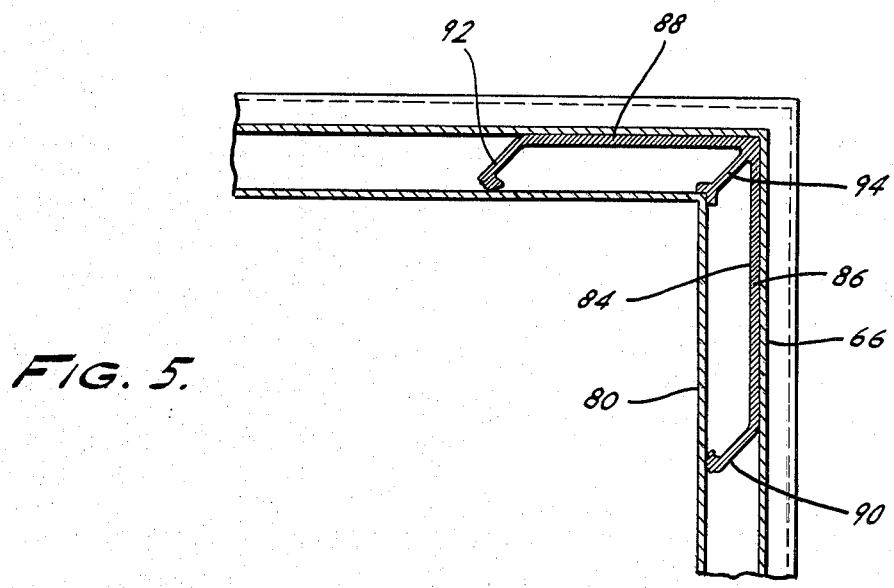
FIG. 5 is a sectional view showing a corner-locking means of the present invention.
Figure 6:
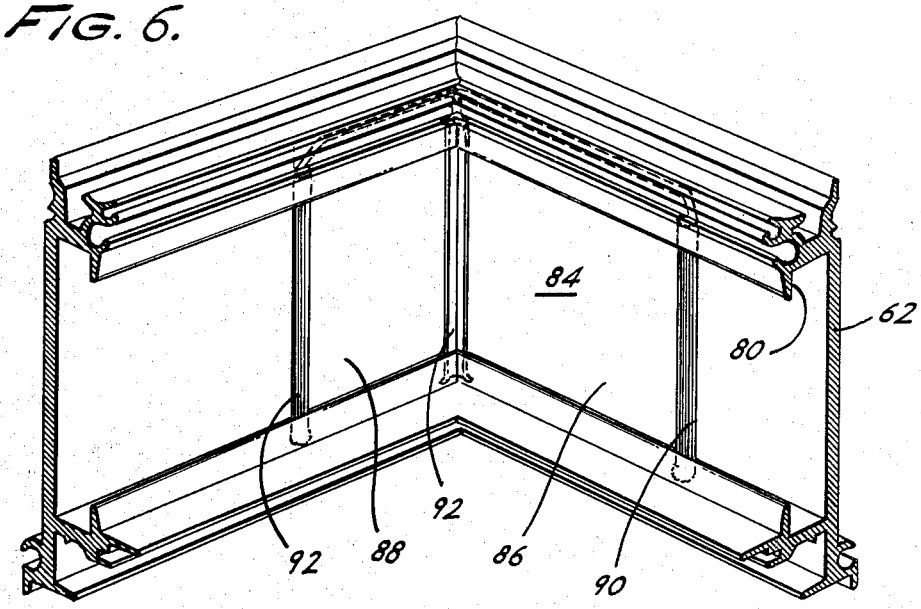
FIG. 6 is a perspective view of the corner-locking means shown in FIG. 5.

The present invention also encompasses corner mating and retention means for the side members of a solar collector assembly. As seen in FIGS. 5 and 6, there is provided inward projections 80 and 82 from side member 62. Inner projections 80 and 82 are adapted to receive a corner locking piece 84 having two angularly disposed legs 86 and 88 with end turnings 90 and 92 adapted to be frictionally retained at the end thereof within the channel formed by inward projections 80 and 82 so as to resists sliding movement of side member 62 away from the corner mating intersection of the side members. Corner locking piece 84 also includes, at the intersection of its two angularly disposed legs an inward pointing support 94, adapted to be retained against mating inward projections 80 and 82, to better support and retain the mating side member 62 at the intersection.

Figure 7:
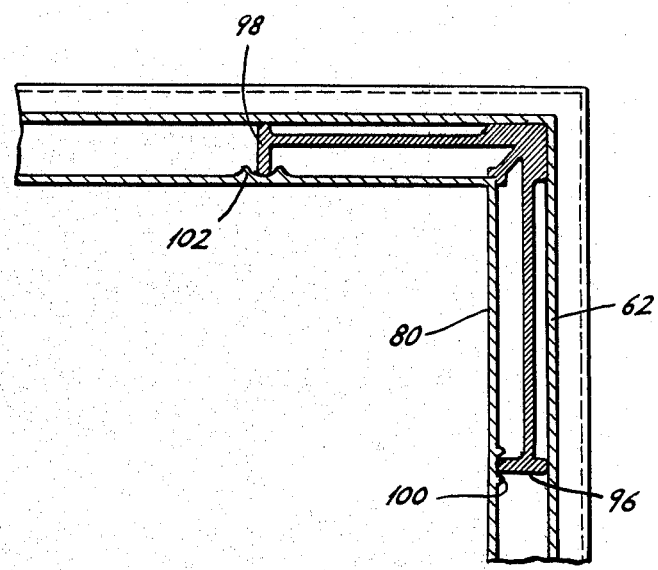
FIG. 7 is a sectional view of still another corner-locking means in accordance with the present invention.
Figure 8:
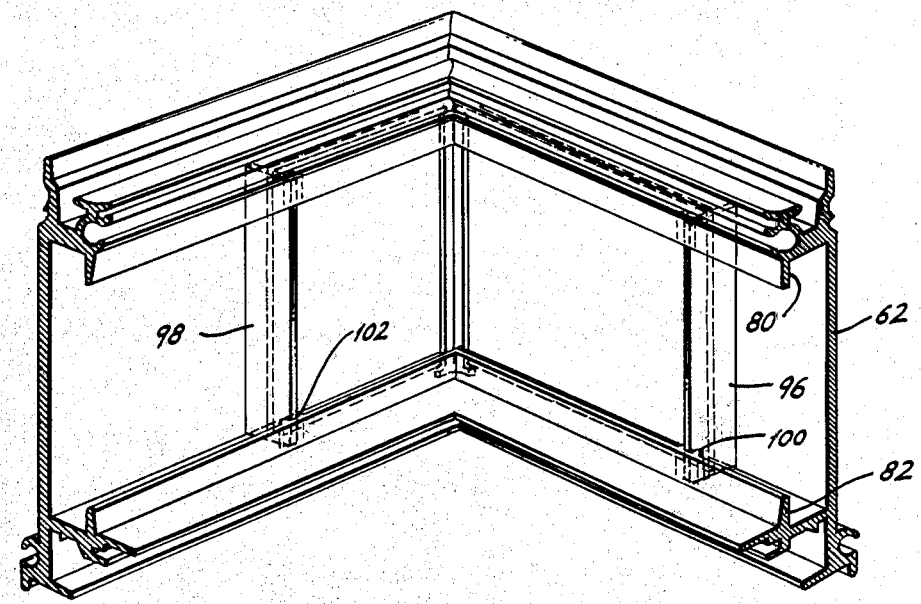
FIG. 8 is a perspective view of the corner-locking means shown in FIG. 7.

In FIGS. 7 and 8, a modified form of the corner locking piece shown in FIGS. 5 and 6 is seen. There, the corner-locking piece includes blunt abutments 96 and 98 which are retained from lengthwise movement within inner projections 80 and 82 by crimps 100 and 102.

While this invention has been described with reference to specific embodiments thereof it should be understood that the claims which follow are intended to be construed to encompass not only the specific embodiments shown and described and various combinations thereof, but also such variants and modifications of the invention which may be devised within the true spirit and scope of the present invention.

I claim:

1. Solar collector assembly including:

solar collector mounting member and mating solar collector housing mounting means, said member comprising a U-shaped channel having an elongated bolt hole in the central leg thereof and aligned shaft holes in the side legs thereof, said means comprising an exterior shaft receiving channel along a side of said housing, said channel said channel having slots therein perpendicular to the length of said channel and space to receive the side legs of said U-shaped channel member, and a shaft in said shaft-receiving channel projecting through the holes of said U-shaped channel member;

a spring loaded solar collector top glazing and seal locking means including a solar collector side member having an upwardly facing top glazing receiving member inward of the collector side and an upward projection outward of said glazing receiving member including an outwardly faced spring receiving tip and an upwardly pointing locking tip, and said means further including a spring member extending along the length of said member with a locking dog adapted to engage said outwardly faced spring receiving tip and a vertical channel adapted to receive, upon slight deflection of said spring member, said upwardly pointing locking tip, said deflection in turn urging downwardly an inward projection of said spring member and thereby adapted to clamp a top glazing member against said upwardly faced top glazing receiving member of said collector side member;

solar collector housing corner mating side members with corner locking means, said side members having inward projections along the length thereof near the top and bottom thereof, said inward projections adapted to receive and retain therein a corner locking piece having two angularly disposed legs, each of which fits into the inward projections of one of said corner mating side members; and means for mounting a rectangular collector plate in a solar collector housing comprising, along two opposite edges of said plate, spring clips fastened to said plate and slidingly retained above and below said plate so as to permit slight lengthwise movement of said clips fastened to said plate and along one of the remaining edges of said plate, spring clips fastened to said plate and slidingly retained only above said plate, and along the other of said remaining edges of said plate, fastening means fastened to said plate and to the adjacent side member of said collector housing.

* * * * *